United States Patent [19]

Giannetto

[11] 3,783,655
[45] Jan. 8, 1974

[54] AUTOMOBILE TRUNK LOCK SAFETY ADAPTER

[76] Inventor: Salvatore Giannetto, 35 Acorn Ln., Plainview, N.Y. 11803

[22] Filed: June 16, 1972

[21] Appl. No.: 263,476

[52] U.S. Cl. .................................. 70/1.5, 70/416
[51] Int. Cl. ............................................ E05b 63/00
[58] Field of Search ................ 70/1.5, 240, 416, 70/422, 423, 418; 109/30, 34

[56] References Cited
UNITED STATES PATENTS

| | | | |
|---|---|---|---|
| 1,904,882 | 4/1933 | Prior | 70/1.5 |
| 3,041,866 | 7/1962 | Segel | 70/1.5 |
| 3,442,102 | 5/1969 | Butts | 70/1.5 |
| 1,764,898 | 6/1930 | Segal | 70/1.5 |
| 2,942,449 | 6/1960 | White | 70/1.5 |

*Primary Examiner*—Robert L. Wolfe
*Attorney*—M. Arthur Auslander

[57] ABSTRACT

An adapter safeties an automobile trunk lock when the lock cylinder is forcibly removed. A spring on the lock rod serves as a secondary precaution.

3 Claims, 9 Drawing Figures

PATENTED JAN 8 1974 3,783,655
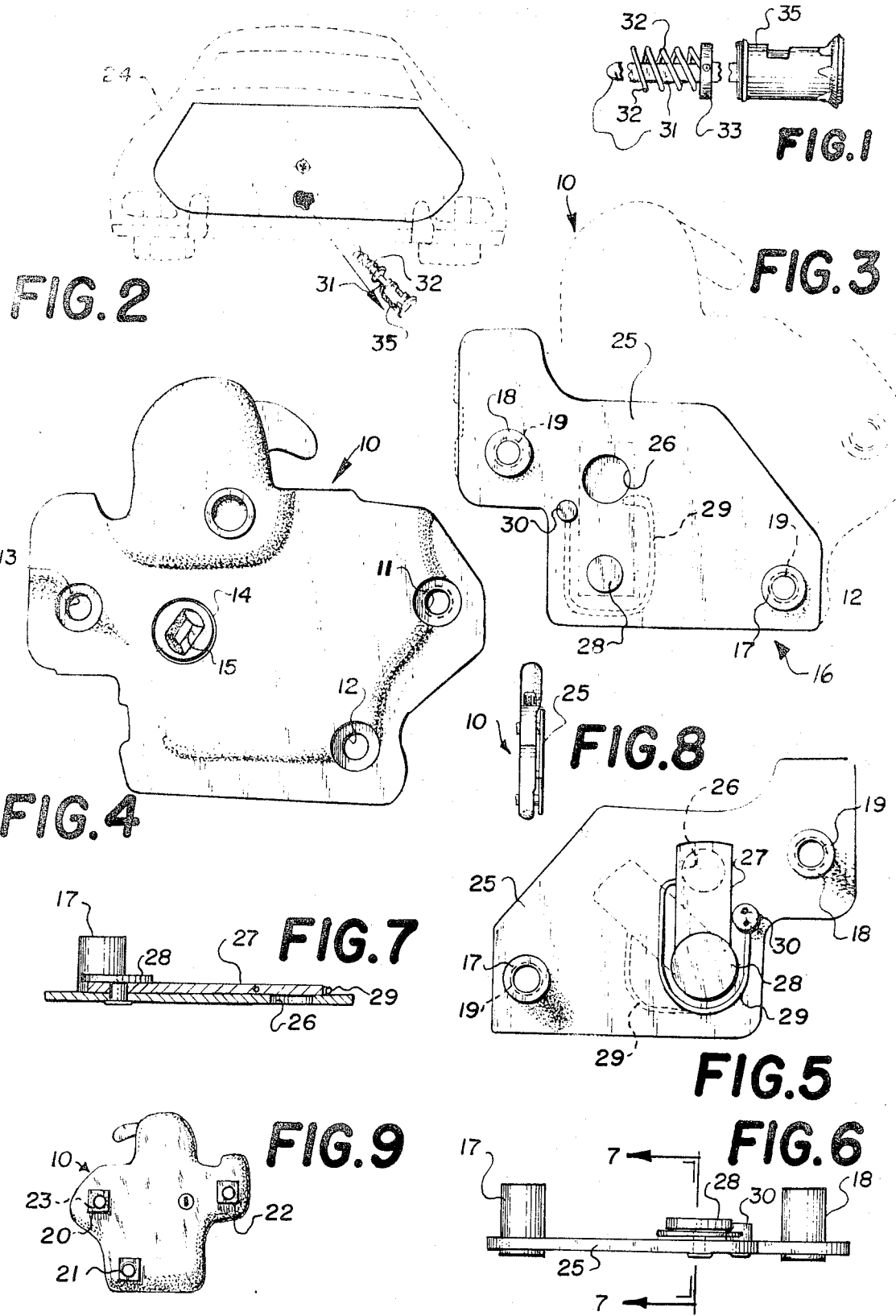

AUTOMOBILE TRUNK LOCK SAFETY ADAPTER

The present invention relates to an automobile trunk lock safety adapter.

Almost all the trunk locks in automobiles today are substantially similar. They are fastened inside the trunk near the center, close to the trunk opening. When locked, a latch engages a keeper. The locking mechanism further includes a cylinder with a rod which reaches through an opening in the trunk lock. Thus, upon a turn of the key, the trunk is unlocked.

In recent years, there has been a great increase in theft from automobile trunks, among other things. The thievery has reached a point of almost professionalism in that with special tools or proper objects, the cylinder may be knocked or pulled out of an automobile trunk in seconds. The rod may be withdrawn then, and the release actuated by a tool or the rod itself may be turned to release the lock to open the trunk.

According to the present invention, an adapter is provided which may be interposed on the existing lock between the inside of the trunk and the lock, the adapter including a safety latch to cover the opening to the lock actuating opening. As a further precaution, since the rod left in place would maintain the adapter latch open, a spring is provided to expel the rod from the lock to allow the latch to quickly close, making the actuating opening inaccessible.

Of particular advantage is that the adapter usually may fit into the normal lock opening structure and lie flat with a thickness generally no greater than the thickest portion of the lock.

Although such novel feature or features believed to be characteristic of the invention are pointed out in the claims, the invention and the manner in which it may be carried out may be further understood by reference to the description following and the accompanying drawings.

FIG. 1 is a broken away view of a conventional lock cylinder and rod with a spring of the present invention.

FIG. 2 is an exploded rear view of an automobile with the cylinder, rod and spring of the present invention removed from the trunk lock.

FIG. 3 is a view of the adapter of the present invention superimposed on a lock, in phantom, such as used in the automobile of FIG. 2.

FIG. 4 is a plan view of the front of a conventional lock useable with the present invention.

FIG. 5 is a rear plan view of the adapter of the present invention.

FIG. 6 is a side elevation of FIG. 5.

FIG. 7 is a section of FIG. 6 along lines 7—7.

FIG. 8 is a left side elevation of the lock and adapter as would be seen in FIG. 3.

FIG. 9 is a rear view of the automobile trunk lock adapted for use with the adapter of the present invention.

Referring now to the figures in greater detail, where like reference numbers denote like parts in the various figures.

The conventional automobile trunk lock 10 is shown in FIG. 4. The latch is in locked position. There are generally three openings 11, 12, 13 through which mounting screws may pass and a rotatable latch release cylinder 14 with a preferably tapered rod receiving slot 15.

The adapter 15 is shown in FIG. 3, with its mounting supports 17, 18 in the openings 12, 13 of the trunk lock 10. The supports 17, 18 include threads 19. The trunk lock 10, as can be seen in FIG. 9, on its reverse side usually includes integral nuts 20, 21, 22 which cover the openings 11, 12, 13.

For the purpose of mounting the trunk lock 10 and adapter 16, the threads in the nuts 21, 22 are preferably drilled out wider than said threads 19, so that screws (not shown) may easily pass through the nuts 21, 22, or opening as screws pass through the threads 19 of the mounting supports 17, 18.

Thus, the threads 23 on the nut 20 serve their normal function when the lock 10 and adapter 16 are fastened inside the body of an automobile 24, and the threads 19 of the supports 17, 18 serve the double function of supporting the adapter 16 and allowing screw fastening of the lock 10 to the body of the automobile 24, normally interposing the adapter 16 between the lock 10 and the body of the automobile 24.

Once the adapter 16 is in place, the rod receiving slot 15 is covered by the adapter plate 25 with the opening 26 of the adapter plate 25 juxtaposed.

Normally, a safety bar 27 held pivotably on a rivet 28 is held tightly closed over the opening 26, biased by a spring 29 which loops around the safety bar 27 held at one end by a rivet 30 and engaging the safety bar 27 on its opposite side, pushing the safety bar 27 against the rivet 30 which also acts as a stop to keep the safety bar 27 over the opening 26.

The rod 31, as shown in FIG. 1, includes a spring 32 which may be mounted on a bushing 33 or against it. The bushing acts as a stop for the spring 32. In the event the rod 31 is disengaged from the cylinder 35, the spring might fly off the rod 31 instead of pushing the rod 31 out of the rod receiving slot 15 with the spring 32 biased against the plate 25.

In use, the lock 10 and adapter 16 are placed in a flat sandwich as shown in FIG. 8. The lock 10 and adapter 16 are affixed to the body of the automobile 24 as heretofore mentioned. The safety bar 27 may have to be held away from the opening 26 so that the rod 31 and cylinder 35 may be properly put in place.

Once the rod 31 and cylinder 35 are in place, the safety bar 27 rests on the rod 31, keeping the opening 26 free, yet allowing the rod 31 to turn freely when actuated by the cylinder 35.

In the event of an attempted theft from the trunk by removing the rod 31 and cylinder 35, the release of the rod 31 propels the rod 31 under the compression of the spring 32 against the adapter plate 25, out of the opening 26, allowing the spring 29 to force the safety bar 27 over the opening 26.

The release cylinder 14 and rod receiving slot 15 become inaccessible to tools with extensive work and time and delay, and the possibility of noise. The work involved for a thief to open the trunk, either tends to frustrate the thief or endanger him to exposure by the noise and effort necessary to be expended in order to obtain access to the automobile 24 trunk.

The terms and expressions which are employed are used as terms of description; it is recognized, though, that various modifications are possible.

Having thus described certain forms of the invention in some detail, what is claimed is:

1. An anti-theft adapter for an automobile trunk lock, said trunk lock including a latch, a release cylinder; said release cylinder including a rod receiving slot; and means to release said latch, a plate, means to mount said plate on said lock, said plate and mounting means normally interposeable between said trunk lock and the body of said automobile, an opening in said plate, said opening adjacent said rod receiving slot, a rod and cylinder lock, said rod extendable through said plate engaged in said rod receiving slot, spring means on said rod biased against said plate, a safety bar, said safety bar pivotally mounted between said trunk lock and said plate, said safety bar biased against said rod at said opening, spring means to urge said safety bar toward said opening, and means to stop said safety bar covering said opening.

2. The invention of claim 1 wherein said springs are held by a bushing said bushing fixed to said rod.

3. The invention of claim 1 wherein there are a plurality of openings on one side of said trunk lock, at least two mounting supports engageable in at least two of said openings on said plate, at least two of said mounting supports including threads, and at least two openings wider than said mounting support threads opening through said trunk lock adjacent said mounting supports.

* * * * *